United States Patent [19]
Geiger et al.

[11] 3,957,950
[45] May 18, 1976

[54] PROCESS FOR PREPARING PURE CHLORINE

[76] Inventors: Friedhelm Geiger, Theodor-Heuss-Strasse 11, 6454 Grossauheim; Werner Heimberger, Baumweg 25, 6450 Hanau; Gerd Schreyer, Greifenhagenstrasse 19, 6454 Grossauheim, all of Germany

[22] Filed: Apr. 2, 1973

[21] Appl. No.: 346,789

[30] Foreign Application Priority Data
Apr. 1, 1972   Germany............................ 2215942
Dec. 20, 1972  Germany............................ 2262267

[52] U.S. Cl................................ 423/240; 423/493; 423/500; 204/128
[51] Int. Cl.² ......................................... C01G 49/10
[58] Field of Search ........... 423/500, 379, 383, 240, 423/493, 500; 260/649; 204/128, 98; 55/72, 74

[56] References Cited
UNITED STATES PATENTS
1,930,526  10/1933  Lykes........................................ 55/72
2,656,011  10/1953  Frey.................................... 423/500
3,168,376  2/1965   Neely................................... 423/500
3,215,504  11/1965  Hagbarth............................. 23/283

FOREIGN PATENTS OR APPLICATIONS
1,244,128  7/1967   Germany ............................ 423/500
1,202,766  10/1965  Germany ............................ 423/500

OTHER PUBLICATIONS
"First Year College Chemistry", by J. R. Lewis, Barnes & Noble Inc., 2nd Ed., 1956, p. 82.
"Webster's 7th New COllegiate Dictionary", 1966, pp. 104, 154.

Primary Examiner—R. L. Andrews
Attorney, Agent, or Firm—Cushman, Darby & Cushman

[57] ABSTRACT

Side reactions in the use of gaseous chlorine are avoided by leading the chlorine containing at least 0.0001% of non-volatile compounds such as ferric chloride over silica gel, glass wool, pumice or montmorillonite. Preferably the thus treated chlorine is passed through hexachlorobutadiene or perfluorokerosene in a second absorption step. Ferric chloride can also be removed from the chlorine gas by treating with sulfuric acid.

15 Claims, 1 Drawing Figure

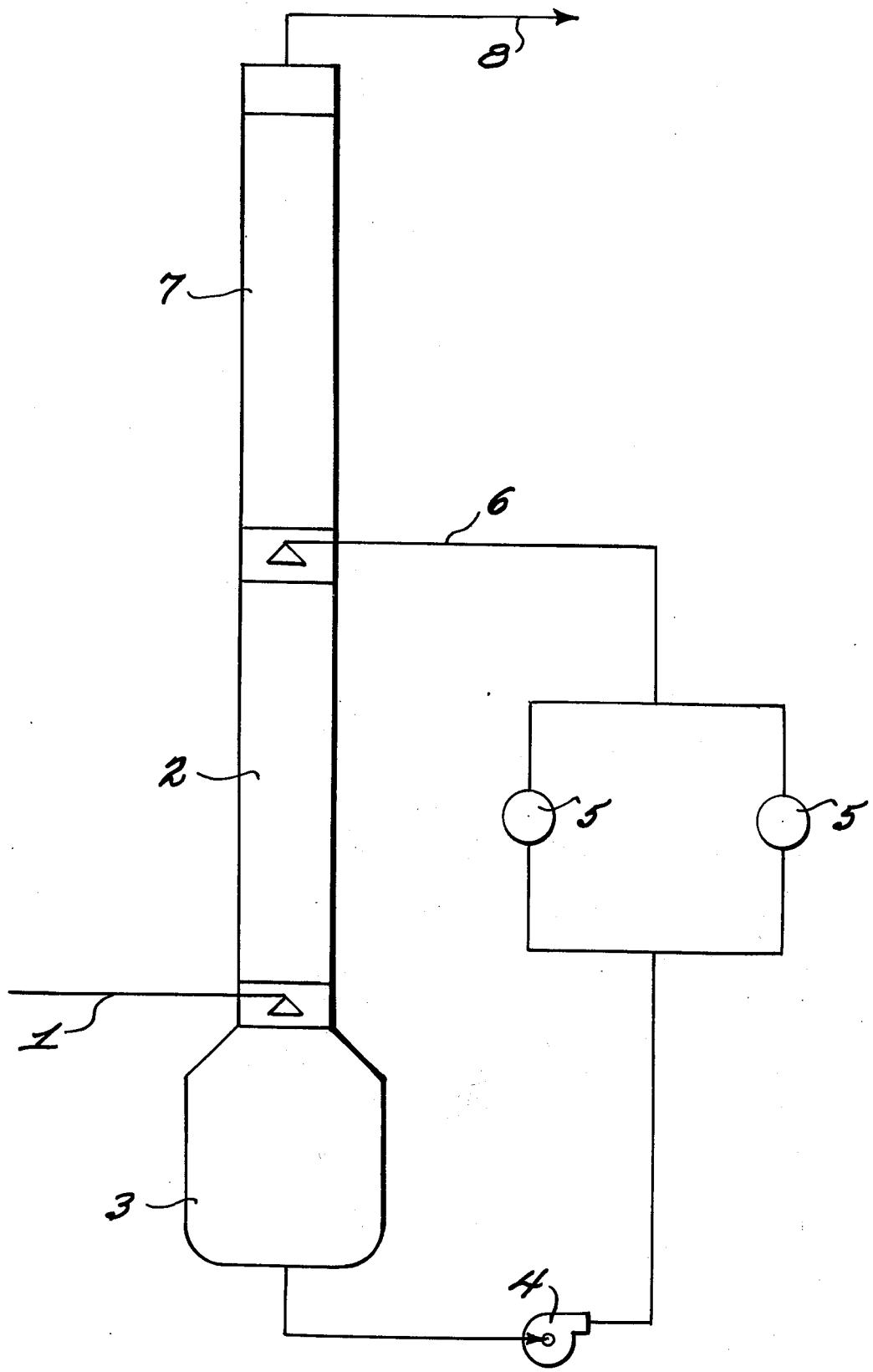

PROCESS FOR PREPARING PURE CHLORINE

In certain chlorination reactions in which gaseous chlorine is used, as for example in the production of benzyl chloride from chlorine and toluene or cyanogen chloride from chlorine and hydrogen cyanide, undesired side reactions such as condensation reactions (for example the Friedel-Crafts reaction) or polymerization occur which besides reducing the yield lead to discoloration and to disturbances in industrial production by clogging the lines, valves and fittings.

The basis for these disturbances was unknown, all the more so since liquid chlorine does not exhibit such difficulties in using it in reactions as, for example, chlorination of hydrocarbons. To be sure in this case the content of nonvolatile compounds of the chlorine purified by an adsorption with silica gel or gelatinous calcium silicate is still 0.001 weight %, but the view prevailed that this amount of nonvolatile compounds was not vaporizable and therefore would not be present in gaseous chlorine.

It has been surprisingly found that the named disturbances in using gaseous chlorine could be traced back to the traces of ferric chloride vapors. This also explains why all previously used precautions to suppress these side reactions have failed to work, as for example, the multiple distillation of the liquid starting material in order to increase its purity before insertion into the reaction because even traces of $0.2 \times 10^{-5}\%$ of $FeCl_3$ disturb the subsequent reactions by the formation of side products.

It has now been found according to one form of the invention, that by leading gaseous chlorine containing 0.001 weight % or more, e.g. 0.01%, of nonvolatile compounds, especially ferric chloride, solid adsorbents such as silica gel, glass wool or pumice, chlorine can be freed quantitatively from the heavy metal compounds. Examples of other metal compounds which can be removed include aluminum chloride and lead chloride.

Besides the adsorbents mentioned above, there can also be employed silicate adsorbents such as montmorillonite or other adsorbents for ferric chloride that are inert to chlorine. The first mentioned adsorbents can be easily regenerated with mineral acids such as HCl or HBr. The adsorption agent is preferably used in an amount of 0.5 to 0.7 parts by weight per 1 part of gaseous chlorine treated. However, such proportions can vary widely and are not the essence of the invention.

In an especially preferred method of carrying out the first form of the invention which is suited for continuous operation, there is provided after the adsorption tower of the first stage, which in a given case can be provided with additional towers in series, a second stage in which the unit is filled with hexachlorobutadiene or a high boiling per fluorinated hydrocarbon such as perfluorokerosene, perfluorododecane, perfluorotetradecane, etc. The second stage serves as a control step for the first adsorption step and catches at the beginning of the exhaustion of the first step the smallest traces of ferric chloride before they enter the reaction vessel. At the beginning of the exhaustion the adsorption tower can be immediately disconnected or, if a series hookup is provided, then the process can be switched to a fresh adsorption tower. The speed of flow of the chlorine used therefore is not changed in contrast to the process of Belgian Pat. No. 636,311. In that patent, in which the liquid chlorine, as above mentioned, is freed of nonvolatile compounds down to 0.001% with silica gel or gelatinous calcium silicate, the speed of flow of the chlorine through the adsorption tower is dependent upon the particular content of the impurities.

Also, if the gaseous chlorine is used for production of cyanogen chloride, for example, in the present process there is no need to slow down the entire process when employing a highly impure chlorine charge.

Both adsorption steps or stages use conventional filled towers of the usual dimension. Thus it has been found that a tower 1 meter long and 100 mm. in diameter, which was filled with 5 kg. of silica gel, operated without trouble for 45 hours at an hourly throughput of 8.3 kg of chlorine. Only after this time, i.e., after the throughput of 370 kg of chlorine, there appeared traces of iron in the after provided second tower (of the same dimensions). The second tower was filled with hexachlorobutadiene. The filling of the first tower was regenerated in known manner with hydrochloric acid. From the second tower samples were taken continuously and, after acidification, tested in customary manner with thiocyanate for traces of iron. As soon as the weakest red coloration is titrated, the first traces of iron can be determined and the first tower disconnected.

The industrial advantages of the process of the invention is in the freedom from disturbance of the reactions in which gaseous chlorine is used. Thus it has been found, for example, that in the production of cyanogen chloride from chlorine and hydrogen cyanide, the reaction is still free of disturbances after 600 hours in contrast to previous processes in which the longest operation was 60 to 80 hours. After that the entire system had to be disconnected because of clogged lines.

Unless otherwise indicated all parts and percentages are by weight.

The following examples further illustrate the process of the invention.

EXAMPLE 1

In a cylindrical, glass chlorination vessel with a UV-light insert there were circulated 100 kg of toluene (1.08 kilogram moles) at 100°C., and 77.5 kg. of chlorine gas were blown in through a glass frit within 24 hours. After a short induction period the solution, which was colored yellow by the chlorine, became colorless with the liberation of hydrogen chloride. The reaction ran to completion without disturbance. In the distillation of the chlorination product freed from dissolved hydrogen chloride, there were taken off ruby-red and dark green intermediate fractions ($n_D^{20}$ 1.5130 to 1.4780) until the boiling point of benzyl chloride was reached.

The yield of pure benzyl chloride ($n_D^{20}$ 1.5393) amounted to 78.1 kg., i.e. 56.8% of theory. There was also obtained:

| | |
|---|---|
| benzal chloride | 21.3% |
| residue | 8.8% |
| toluene | 11.0% |

EXAMPLE 2

The same amounts of toluene and chlorine were reacted under the conditions described in example 1. However, for purification of the chlorine gas there was connected a tower containing 5 kg of silica gel which retained the traces of ferric chloride originating in the chlorine gas for 116 hours. The ferric chloride which broke through was ascertained by providing a gas washing apparatus at the outlet side. This apparatus was filled with hexachlorobutadiene (B.P. 214°C.). Samples of the solvent drawn off shaken with dilute hydrochloric acid and tested for ferric ions in the usual way with ammonium thiocyanate. When ferric chloride breaks through the hydrochloric acid sample becomes plainly red colored. The crude chlorination product obtained in this manner contained no nuclear chlorinated product and in the distillation there was not obtained a colored intermediate product.

The yield was 68.8% benzyl chloride, 17.6% benzal chloride and 2.4residue. The remainder of 10.2% was unreacted toluene.

EXAMPLE 3 (a)

Chlorine gas and hydrogen cyanide gas in about equimolar proportions were passed over a reactor filled with catalyst to produce cyanogen chloride. The catalyst was graphite.

The reaction to form cyanogen chloride and hydrogen chloride took place at about 450° to 510°C. At a charging of the reactor with 8.3 kg/hr of chlorine and 3.1 kg/hr of hydrocyanic acid there was already obtained after 72 hours of operation an increase in pressure in the reactor. After about 100 hours of operation it had to be turned off because the reactor was clogged. Upon opening the reactor it was ascertained that the cause of the clogging was a yellow brown crystal mass at the gas outlet which commenced to grow at the outlet of the tube bundle and then covered the entire cover. The product was identified by analysis and odor as cyanuric chloride. It is known that ferric chloride is effective as a catalyst for converting cyanogen chloride to cyanuric chloride.

EXAMPLE 3 (b)

The procedure of example 3a was repeated but there was provided a tower containing 5 kg of silica gel through which the charge of 8.3 kg/hr of chlorine was passed before going to the reactor and the silica gel was changed every 45 hours. The reactor was operated for over 1000 hours without disturbance.

The silica gel was regenerated by washing with dilute hydrochloric acid and water followed by drying. While hydrochloric acid is the preferred acid for regenerating the adsorbent, there can be used any mineral acid which forms a water soluble ferric salt, e.g., hydrobromic acid or sulfuric acid.

The first form of the invention, however, has the disadvantage that after a certain time the silica gel as well as the other materials are exhausted and either must be exchanged for fresh material or must be regenerated by the use of mineral acids such as hydrochloric acid.

The second form of the invention has as the object the development of a process for purifying gaseous, industrial chlorine either continuously or discontinuously over practically unlimited times.

According to this second form of the invention very pure chlorine can be produced which avoids side reactions when used in the gaseous condition in organic syntheses if non purified or only customarily commercially purified liquid chlorine before the chlorination reaction is vaporized, the chlorine gas quantitatively freed from ferric chloride by passing through sulfuric acid and the chlorine used directly in the iron free condition or condensed in iron free apparatus, stored and again vaporized before the start of the chlorination reaction).

As sulfuric acid there can be employed 70 to 100% sulfuric acid, preferably the commercial, about 96% sulfuric acid.

The content of ferric chloride in the chlorine gas is due to materials with which the chlorine comes in contact during its production and vaporization. Also all other volatile halides which may be present with the ferric chloride, are removed.

As iron-free materials there can be used, for example, glass, porcelain, stoneware, tantalum or lead.

By the purification process of the invention there can be removed quantitatively traces of $0.2 \times 10^{-5}$ weight % of ferric chloride from gaseous chlorine.

The purification is carried out easily by introduction of gaseous chlorine in a suitable reaction vessel filled with sulfuric acid. In an especially advantageous form of the invention which is suitable for continuous operation on an industrial scale, the impure, gaseous chlorine is led into an absorption column provided with packing or corresponding installations and purified with the help of concentrated sulfuric acid by countercurrent adsorption. The optimum throughout of gaseous chlorine as well as the repumped sulfuric acid is merely dependent upon the construction data of the absorption column which is calculated in known manner and permits adaptation to any desired chlorine throughput.

When in the purification it is a matter of simultaneously carrying out a chemical reaction, for a complete purification of the chlorine, a residence time of a fraction of a second is sufficient. The metal compounds, such as ferric chloride, which are contained in the gaseous chlorine, change in the absorption column into the corresponding non volatile sulfates and remain quantitatively in the sulfuric acid.

Since in a continuous operation the metal sulfate in the sulfuric acid is continuously enriched and finally separates as an insoluble, the sulfuric acid after a definite time must be either replenished or, according to a preferred method, after flowing through the column is sent over a suitable filter and the insoluble salt separated.

The temperature for the absorption is not critical, within wide ranges it has no influence on the absorption. Preferably the environmental temperature is chosen, however, higher or lower temperatures can also be used.

The generally minimal amount of gaseous hydrogen chloride occuring by reaction of metal chlorides with sulfuric acid in the absorption to be sure is carried out with the gaseous chlorine but in no case distrubs the subsequent use of the chlorine in the chlorination reaction.

The industrial advantages of this form of the process of the invention is in the freedom from disturbance in the reactions in which the gaseous chlorine is used. Thus it has been found that in the production of cyanogen chloride from chlorine and hydrogen cyanide, the reaction is still free of disturbance after 3 months operation in contrast to chlorination using unpurified chlorine. In that case the production must be interrupted after 60 to 80 hours on account of the clogged fittings and the concentration of byproducts.

The single FIGURE of the drawings illustrates schematically one way of carrying out this form of the invention.

EXAMPLE 4

The same amounts of toluene and chlorine were reacted under the conditions described in example 1. However, for purification of the chlorine gas there was connected a glass vessel with 3 liters of 96% sulfuric acid and the gas led through a glass line into the reactor. There could not be detected any ferric chloride in the washed chlorine gas. The crude chlorination product obtained in this manner contained no nuclear chlorinated product and in the distillation there was not obtained any colored intermediate product. The yield amounted to 95.8 kg of benzyl chloride which was 70.1% of theory. There was also obtained 15.0% benzal chloride, 1.8% residue and 11.1% toluene.

EXAMPLE 5

The process of example 3a was repeated but modified as shown in the drawing.

The chlorine was introduced through line 1 into glass absorption column 2 (diameter 80 mm) and from the 25 liter 96% sulfuric acid containing glass still 80 liters/hour of sulfuric acid were pumped through conduit 6 to the top of the absorption column with the help of the glass centrifugal pump 4. The chlorine leaving the column through conduit 8 contained no detectable traces of ferric chloride. (The chlorine was led by way of a conduit of pure nickel, to the pure nickel reactor for forming the cyanogen chloride). The reactor showed no disturbances after 3 months operation using the same reactants and rates as in example 3a. The filters 5 serve for removal of metal sulfates separated from the circulating sulfuric acid. The numeral 7 indicates the stripping part of column 2.

What is claimed is:

1. A process for removing ferric chloride vapor which is present as an impurity in a gas consisting essentially of chlorine and containing said ferric chloride as an impurity comprising passing the chlorine gas through a member of the group consisting of (1) solid adsorbents for ferric chloride which are inert to chlorine, and (2) sulfuric acid.

2. The process according to claim 1 wherein the chlorine gas is contacted with sulfuric acid.

3. The process according to claim 2 wherein the sulfuric acid is 70 to 100% sulfuric acid.

4. The process according to claim 3 wherein the chlorine gas and sulfuric acid are passed in countercurrent flow.

5. The process according to claim 2 wherein the ferric chloride is removed quantitatively.

6. The process according to claim 1 wherein the ferric chloride impurity is present in an amount of at least $0.2 \times 10^{-5}$ weight % of the gaseous chlorine.

7. The process according to claim 6, wherein the chlorine is passed through a member of the group consisting of (1) a solid adsorbent selected from the group consisting of silicate adsorbents and silica gel and (2) sulfuric acid.

8. The process according to claim 5, wherein the temperature is ambient temperature.

9. The process according to claim 1 wherein the chlorine gas is contacted with a solid adsorbent.

10. The process according to claim 9 wherein the ferric chloride is initially present in an amount of over 0.001%.

11. A process for removing ferric chloride vapor which is initially present in an amount of over 0.001% as an impurity in a gas consisting essentially of chlorine and containing said ferric chloride as an impurity comprising passing the chlorine gas through a solid adsorbent for ferric chloride selected from the group consisting of silica gel, glass wool, pumice and montmorillonite.

12. The process according to claim 1 wherein the adsorbent is regenerated with mineral acid.

13. The process according to claim 10 wherein the adsorbent is silica gel and the mineral acid is dilute hydrochloric acid.

14. The process according to claim 1 wherein the chlorine gas after contacting the adsorbent is passed through hexachlorobutadiene or a nonvolatile liquid perfluorohydrocarbon.

15. A process for removing ferric chloride vapor which is present as an impurity in a gas consisting essentially of chlorine and containing said ferric chloride as an impurity comprising passing the chlorine gas through a solid adsorbent for ferric chloride selected from the group consisting of silicate adsorbents and silica gel.

* * * * *

UNITED STATES PATENT AND TRADEMARK OFFICE
CERTIFICATE OF CORRECTION

PATENT NO. : 3,957,950
DATED : May 18, 1976
INVENTOR(S) : GEIGER, Friedhelm, HEIMBERGER, Werner and SCHREYER, Gerd It is certified that error appears in the above-identified patent and that said Letters Patent are hereby corrected as shown below:

Claim 12, line 1 change "1" to --11--.

Claim 13, line 1 change "10" to --12--.

Signed and Sealed this

Fourth Day of March 1980

[SEAL]

Attest:

SIDNEY A. DIAMOND

Attesting Officer     Commissioner of Patents and Trademarks

Disclaimer 3,957,950.—*Friedhelm Geiger*, Grossauheim, *Werner Heimberger*, Hanau, and *Gerd Schreyer*, Grossauheim, Germany. PROCESS FOR PREPARING PURE CHLORINE. Patent dated May 18, 1976. Disclaimer filed Dec. 26, 1979, by the assignee, *Deutsche Gold-Und Silber Scheideanstalt Vormals Roessler*.

Hereby enters this disclaimer to claims 1-8, 10 and 14 of said patent.

[*Official Gazette, April 8, 1980.*]